J. REINEHR.
VEHICLE.
APPLICATION FILED JAN. 31, 1910.
961,532.
Patented June 14, 1910.
3 SHEETS—SHEET 1.
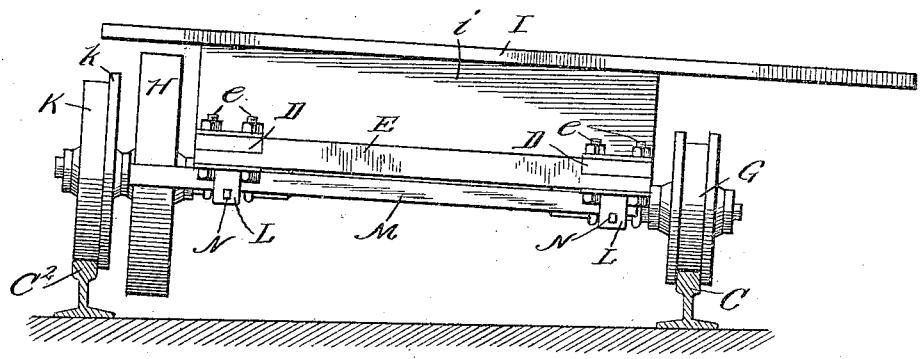
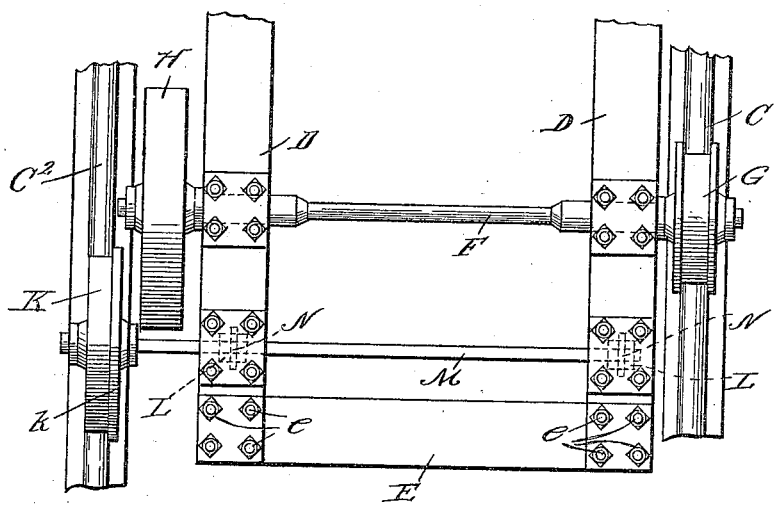
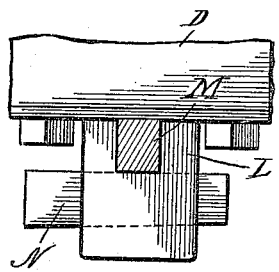

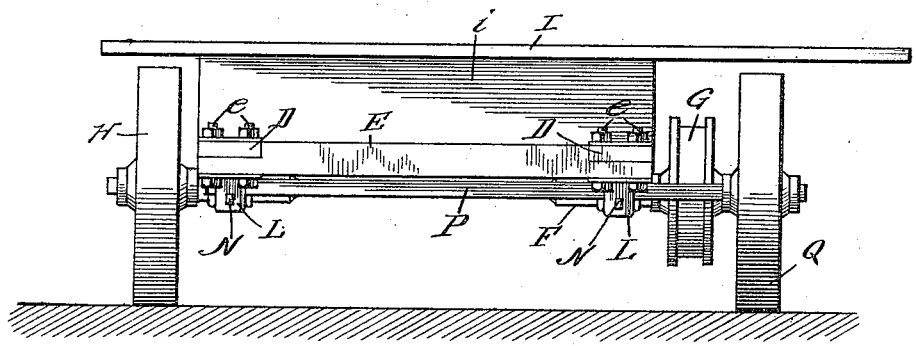
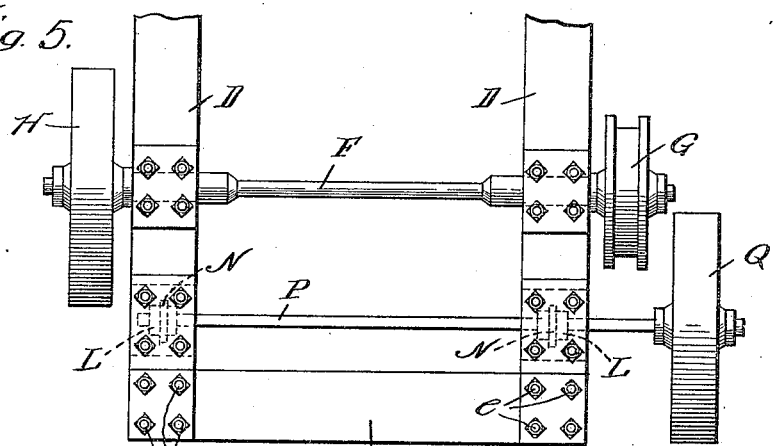
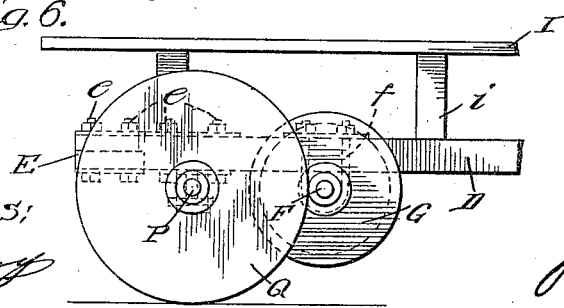

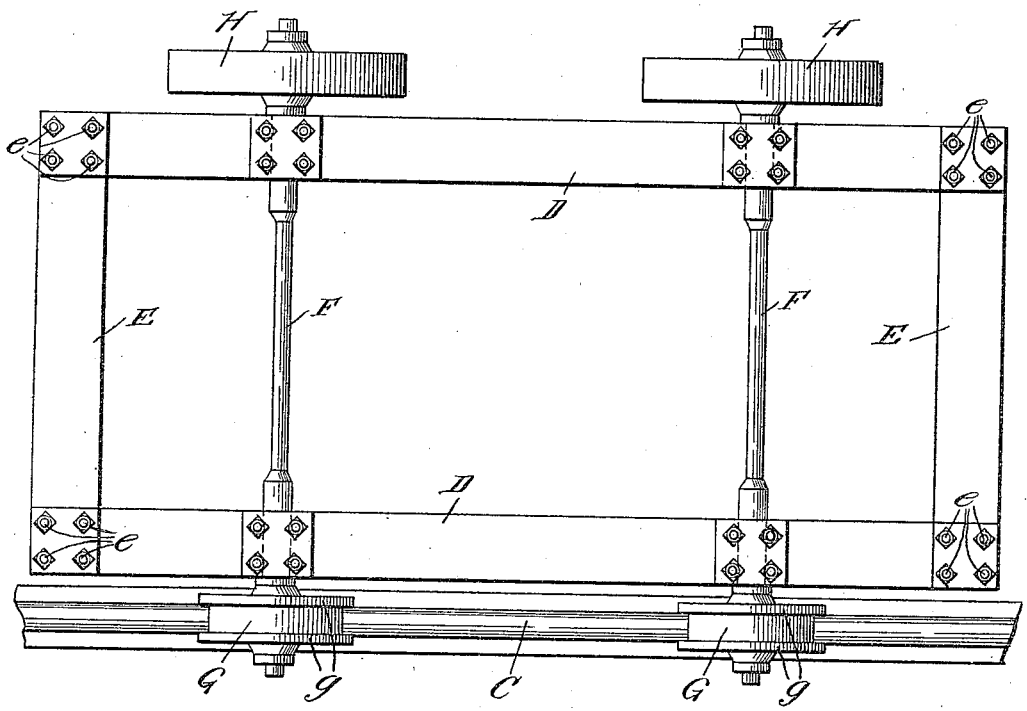
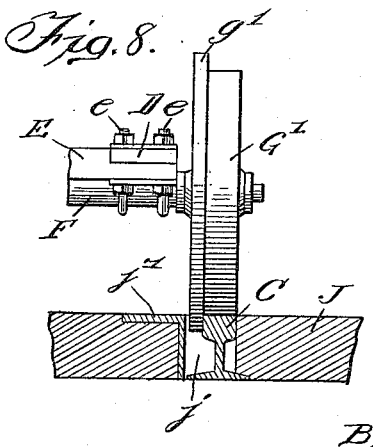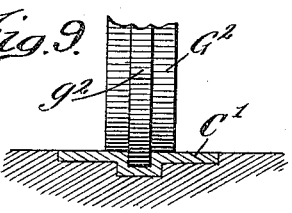

UNITED STATES PATENT OFFICE.

JOHN REINEHR, OF SAVANNA, ILLINOIS, ASSIGNOR, BY DIRECT AND MESNE ASSIGNMENTS, TO RAIL LAYING MACHINE COMPANY, A CORPORATION OF ILLINOIS.

VEHICLE.

961,532.  Specification of Letters Patent.  Patented June 14, 1910.

Application filed January 31, 1910. Serial No. 541,005.

*To all whom it may concern:*

Be it known that I, JOHN REINEHR, a citizen of the United States, residing at Savanna, in the county of Carroll and State of Illinois, have invented certain new and useful Improvements in Vehicles, of which the following is a specification.

My invention relates to a vehicle of the character shown in Patent No. 948,023 for rail laying apparatus, granted to me February 1, 1910, and has for its object to provide certain new and improved constructions and arrangements in a vehicle of the sort which will be hereinafter described and claimed.

The invention is shown in a preferred embodiment in the accompanying drawings, wherein;

Figure 1 is an end view of the vehicle. Fig. 2 a fragmentary plan view of the same with the flooring removed. Fig. 3 a detail elevation, with parts in section, illustrating one of the supporting devices for the temporary axles. Fig. 4 an end view of the same vehicle provided with a different set of temporary supporting wheels. Fig. 5 a fragmentary plan view of the arrangement shown in Fig. 4, with the platform of the car removed. Fig. 6 a side elevation of the parts shown in Fig. 4. Fig. 7 a plan view of the vehicle with the temporary wheels and axles removed. Fig. 8 a detail view illustrating a modified form of track and corresponding form of flanged wheels, and Fig. 9 a similar view illustrating another modification.

Like characters of reference indicate like parts in the several figures of the drawings.

Referring to the drawings, the vehicle or truck is shown as consisting of a frame composed of the side pieces D and the end pieces E, secured together by bolts $e$, cross timbers $i$, platform I and axles F, carrying at one side of the truck the wheels G having flanges $g$, adapting them to run on the T rail C, and on the other side the flat-tired wheels H, preferably of greater diameter than wheels G, the wheels H being adapted to travel on a nonguiding surface, for example, directly on the roadbed of a railroad when the vehicle is to be used in railroad work.

The truck or vehicle, as described so far, is substantially the same as the truck employed for supporting the rail laying apparatus of my patent above referred to. In order to adapt this truck to run upon the ordinary two-rail track, I provide means whereby the vehicle may be temporarily furnished with flanged wheels arranged on the side of the vehicle on which the wheels H are located and adapted when used, to hold the wheels H out of contact with the ground. K designates one of these supplemental wheels. Preferably, it is formed with the flange K.

$C^2$ is the rail on which this wheel runs. The wheel is carried on an axle M which is rectangular in cross section and extends through boxes or supports L secured to the under sides of the side pieces D. Wedges N hold said axle in position in the supports. Any other means might be provided for temporarily securing the axle M to the vehicle.

In Figs. 4, 5 and 6 the vehicle or truck is provided with flat-tired wheels on the side of the flanged wheels G, which arrangement enables the truck to be run on a nonguiding surface when this is desirable. The wheel Q is carried on the axle P, which is secured in the supports L by means of the wedges N, in the manner above described.

In Fig. 7 I have shown the truck without the supplemental or temporary wheels, that is to say, with its supporting wheels G and H in position to sustain the car on the one side on a rail and on the other side on a nonguiding surface.

In Fig. 8 a modification has been suggested of the track and wheel construction which can be substituted for the construction described above. The track C in this instance is shown as sunk in a flooring J, and the wheel G' is formed with a single flange $g'$. Preferably, the flooring at the side of the slot $j$ is protected by the angle iron $j'$.

Fig. 9 shows another modified construction in which the track C' consists of a guttered or channeled strip of metal and the wheel $G^2$ is formed with a central flange or rib $g^2$.

As other modifications will readily suggest themselves in accordance with the use to which the vehicle is put and the place where it is to be used, I do not limit myself to the particular constructions, devices and arrangements shown and described. It will be understood that the vehicle of my invention might be used in a variety of different situations.

I do not limit myself to the employment of the invention in a rail laying machine such as that shown in my patent above referred to, nor to its use on the track or roadbed of a railroad.

I claim—

1. The combination with a vehicle having wheels on each side thereof normally supporting the same, of a wheel adapted to be removably secured to said vehicle in position to support the same at one side and to hold the other wheels at that side out of operative contact with the surface on which they are designed to run.

2. The combination with a vehicle having flanged supporting wheels on one side thereof and non-flanged supporting wheels on the other side thereof, the aforementioned wheels being adapted to normally support said vehicle, of a wheel adapted to be removably secured to the vehicle in position to support the same at the side provided with the non-flanged wheels and to hold the said non-flanged wheels out of operative contact with the surface on which they normally run.

3. The combination with a vehicle having flanged supporting wheels on one side thereof and non-flanged supporting wheels on the other side thereof, the aforementioned wheels being adapted to normally support said vehicle, of a flanged wheel adapted to be removably secured to the car in position to support the same at the side provided with the non-flanged wheels and to hold said non-flanged wheels out of operative contact with the surface on which they normally run.

4. The combination with a vehicle comprising a body and wheels which normally support said body, the wheels on one side being flanged and those on the other non-flanged wheels, of an axle adapted to be removably secured to the body of said vehicle and a wheel on said axle adapted to support the vehicle on one side thereof and to hold the wheels on that side of the vehicle out of contact with the surface on which they normally run.

5. The combination with a vehicle having flanged supporting wheels on one side thereof and non-flanged wheels on the other side thereof, the aforementioned wheels normally supporting said vehicle, of a wheel adapted to be removably secured to said vehicle in position to support the same at the side provided with the flanged wheels and to hold the latter out of contact with the surface on which they normally run.

6. The combination with a vehicle having flanged supporting wheels on one side thereof and non-flanged wheels on the other side thereof, the aforementioned wheels normally supporting said vehicle, of a non-flanged wheel adapted to be removably secured to said vehicle in position to support the same at the side provided with the flanged wheels and to hold the latter out of contact with the surface on which they normally run.

JOHN REINEHR.

Witnesses:
P. H. TRUMAN,
E. L. BREIDERT.